United States Patent [19]
Larson

[11] 3,859,491  
[45] Jan. 7, 1975

[54] CONTACT ASSEMBLY AND METHOD OF MANUFACTURE OF HAVING SILVER-CADMIUM OXIDE CONTACTS AFFIXED TO A BRASS CARRIER

[75] Inventor: Laurence Eric Larson, Bloomington, Ill.

[73] Assignee: General Electric Company, New York, N.Y.

[22] Filed: Aug. 31, 1973

[21] Appl. No.: 393,582

[52] U.S. Cl. .............................. 200/266, 219/117  
[51] Int. Cl. ............................................. H01h 1/02  
[58] Field of Search .......... 200/266, 265, 264, 270, 200/263; 219/117, 118

[56] References Cited  
UNITED STATES PATENTS  
3,226,517  12/1965  Schreiner ........................... 200/266  
3,571,546  3/1971  Sedlak ............................... 200/266

*Primary Examiner*—Harold Broome  
*Attorney, Agent, or Firm*—Stephen A. Young; P. L. Schlamp; R. G. Simkins

[57] ABSTRACT

Silver-cadmium oxide contacts affixed to a brass carrier. The brass carrier has a layer of copper electroplated thereon. Each of a pair of silver-cadmium oxide contact buttons are axially aligned with the copper layer and positioned adjacent opposite ends of one surface of the brass carrier. The contact buttons are then welded to the brass carrier.

9 Claims, 4 Drawing Figures

Patented Jan. 7, 1975

3,859,491

CONTACT ASSEMBLY AND METHOD OF MANUFACTURE OF HAVING SILVER-CADMIUM OXIDE CONTACTS AFFIXED TO A BRASS CARRIER

BACKGROUND OF THE INVENTION

1. Field of the Invention

This invention relates to contact assemblies and a method of fabricating contact assemblies, and more particularly to the affixing of silver-cadmium oxide contacts to a brass carrier.

2. Description of the Prior Art

When making contact assemblies for devices such are relays, contactors, and the like, wherein the contact assemblies can be either stationary or movable, the actual contact buttons can be brazed to a contact carrier or support. However brazing is very expensive and time consuming, and also involves an additional series of problems. These problems pertain to the fact that in brazing the heating of the contact button and a portion of the support is not localized and instead the whole or large portions of the support become heated to the actual brazing temperature. As a result of this non-localized heating, the support upon cooling begins tobo anneal in an unknown and uncontrolled fashion depending upon various air gradients that surround it during cooling. Under these circumstances the actual physical characteristics of the support, such as strength, may change to such an extent that the support is no longer suitable for its original intended purpose.

In view of the serious disadvantages of the above described brazing technique, contacts are preferably electrical resistance welded to the respective carriers or supports. When welding a silver-cadmium oxide contact button to a brass support, the button is placed on a cup shaped welding electrode, while one side of the brass support is positioned on the button, and another electrode is brought into contact with the opposite side of the support and in alignment with the button. Then by applying optimum electrode pressure and current to the assembly, the contact button is reliably welded to the support. However, when this procedure is followed, the welding of the silver-cadmium oxide contact button to the brass support under optimum electrical resistance welding current and pressure conditions causes the brass adjacent one of the welding electrodes to melt and adhere to the electrode face. The adhesion of the brass of the face of the electrode eventually causes an explosion which destroys the contact assembly to be welded and ultimately the electrode itself. If the welding pressure and current conditions are varied so as to be at less than optimum value, no brass adheres to the welding electrode, but the resulting welds are of an inconsistent quality and the contact assemblies have a high failure rate due to the contact buttons being easily broken away from their support. Thus consistently satisfactory welds between silver-cadmium oxide contacts and a brass support are generally obtainable only under optimum welding pressure and current conditions having a restricted range of values, and under these conditions melted brass often adheres to and causes the destruction of both the welding electrode and the contact assembly.

In order to avoid the above described problem resulting from welding silver-cadmium oxide contacts to a brass carrier, the brass carrier has been replaced by copper carrier. Inasmuch as copper has a higher melting temperature than brass, it was hoped that the problem of electrode destruction would be eliminated. However, due to the fact, that the resistivity of copper is lower than the resistivity of brass, a higher welding current is required when using a copper carrier or support, and the same unsatisfactory adhesion of melted metal to the electrodes followed by its ultimate destruction still occurs.

OBJECTS OF THE INVENTION

It is therefore an object of this invention to provide a new and improved contact assembly adapted for being manufactured without any of the aforementiond disadvantages.

It is another object of this invention to provide for a method of affixing silver-cadmium oxide contacts to brass carriers using welding techniques.

It is another object of this invention to provide a new and improved method of affixing silver-cadmium oxide members to brass supports using welding techniques wherein the welding parameters are substantially less critical in obtaining reliable welds.

Other objects of the invention will be pointed out in and understsood from the following.

SUMMARY OF THE INVENTION

In accordance with a broad aspect of the invention there is provided a silver-cadmium oxide member affixed to a brass support. The brass support is coated with a copper layer, and the silver-cadmium oxide member is welded to the brass support by positioning one electrical resistance welding electrode in contact with the member and another such welding electrode in axial alignment with the member and in contact with the copper layer. In this manner a contact assembly can be fabricated such that one or more silver-cadmium oxide contact buttons are each welded to the brass support.

DESCRIPTION OF A PREFERRED EMBODIMENT

Details of the invention will now be explained referring to FIGS. 1 through 4.

Figure 1:
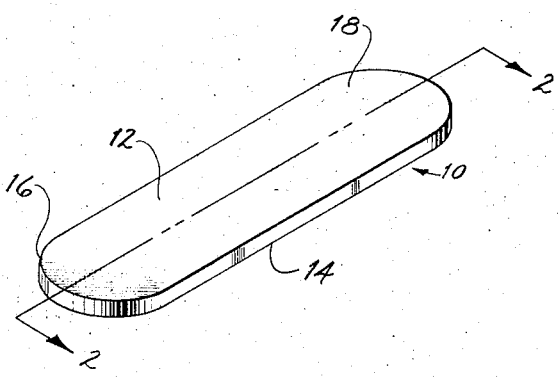
FIG. 1 is s perspective view of one form of brass carrier or support.

An elongated brass carrier 10 is shown in FIG. 1, ahd has a standard composition of, for example, approximately 30% zinc and 70% copper with a melting temperature of approximately 955°C. While carrier 10 is illustrative of the movable carriers used in relay or contactor assemblies or other such type devices, it is to be understood that the brass carrier can have geometric configurations other than the elongated flat structure shown in FIG. 1. Also it can be used to provide support for a stationary contact assembly just as well as it can provide support for a movable contact assembly. The specific structure shown in FIG. 1 has respective top and bottom flat faces 12 and 14 and semi-circular end portions 16 and 18. By way of example only, the brass carrier may be approximately .080 inch thick, while the radius of curvature of the end portions is approximately 5/32 inch and the overall lenth is approximately 1 3/16 inches.

Figure 2:
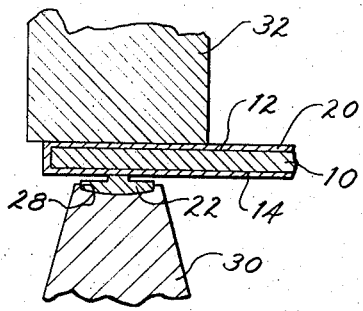
FIG. 2 is a partial front sectional view of sivler-cadmium oxide contact button being welded to the copper plated brass carrier taken along line 2—2 of the carrier shown in FIG. 1.

In accordance with the invention, carrier 10, as shown in FIG. 2, has a copper layer 20 deposited thereon. As a matter of convenience copper layer 20 may be deposited over the entire carrier surface using standard electro-plating techniques or any other suitable known deposition technique, such as electroless deposition, sputtering, etc. The copper layer may be approximately 1 to 1.5 mil thick and may further range in thickness depending upon specific design considerations, such as the ultimate size of the contact system being used. While the overall surface of the brass carrier has been described as coated with a layer of copper, alternatively, if one so desires, copper can be selectively deposited on the carrier at those locations where the welding electrode will contact the carrier.

Figure 3:
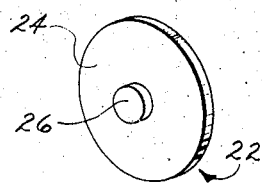
FIG. 3 is a bottom perspective view of a silver-cadmium oxide contact button.

A silver-cadmium oxide contact button 22 shown in FIG. 3 is comprised of a standard well known alloy composition which is specifically used for that purpose and has, in this example, an overall diameter of approximately one-fourth inch. The button is manufactured using standard techniques of first mixing cadmium with silver to form an alloy having between 10 and 15% cadmium by weight. The alloy is then headed or shaped to its final configuration and then oxidized to the extent that the final composition is silver-cadmium oxide. As shown in FIG. 3, the bottom surface 24 of the contact button is flat and has a centrally located protruding portion 26 depending therefrom.

Figure 4:
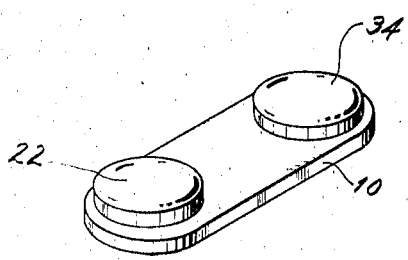
FIG. 4 is a top perspective view of a completed assembly.

Using standard readily available welding apparatus the contact buttons are welded to the copper plated brass carrier as follows. As shown in FIG. 2 contact button 22 is placed on a cup shaped tip 28 of a first welding electrode 30, which electrode is tapered toward the cup shaped end, such that protruding portion 26 of button 22 is facing upward. Welding electrode 30 in this instance may be an RWMA class 11 copper alloy electrode which is compatible with the welding apparatus. End portion 16 on bottom face 14 of copper plated brass carrier 10 is placed in contact with the protruding portion of button 22. Then a second welding electrode 32 is axially aligned with button 22 and brought into engagement with that portion of copper layer 20 on face 12 of carrier 10. Welding electrode 32 may be a cylindrically shaped RWMA class 13 tungsten faced electrode which is also compatible with welding apparatus used. In this instance a consistent and reliable weld between silver-cadmium oxide contact button 22 and carrier 10 is obtained by applying, for example, approximately 290 lbs. of electrode force and approximately 14,200 amps of welding current for a welding time of approximately 1/60 of a second to button 22 and the juxtaposed area of carrier 10. The process can be repeated to weld another silver-cadmium oxide contact button 34 to end portion 18 of face 14 of the copper plated brass carrier as shown in FIG. 4.

While specific examples of electrode force and current have been described above, it should be understood that these values can vary depending upon variations in characteristics of the material and the overall structure used. Furthermore, by welding silver-cadmium oxide contact buttons to the copper plated brass carrier, the contact buttons are reliably affixed to the carrier without running the risk of having any metal from the carrier melt and adhere to the electrode. Still further, the welding operation can be performed without the previously necessary critical control over the electrode welding pressure and current.

Although the invention has been described with reference to a specific embodiment thereof, numerous modifications are possible without departing from the invention and it is desirable to cover all modifications falling within the spirit and scope of this invention.

What I claim as new and desire to secure by Letters Patent of the United States is:

1. A composite contact assembly fabricated by means of electrical resistance welding, comprising:
   a. a support including a brass contact carrier and a copper layer extending over substantially the total surface area of said carrier; and
   b. a first silver-cadmium oxide contact member resistance welded directly to said support by opposed welding electrodes brought into contiguous position with said contact member and said copper layer.

2. A contact assembly according to claim 1 wherein said copper layer and said silver-cadmium oxide contact are positioned adjacent one end of said contact carrier.

3. A contact assesmbly according to claim 1 further comprising another silver-cadmium oxide contact attached to said support and in axial alignment with said copper layer.

4. A contact assembly according to claim 3 wherein said silver-cadmium oxide contacts are in the form of circular buttons, each contact having a flat bottom surface and a central protruding portion depending from said flat bottom surface.

5. A contact assembly according to claim 4 wherein said central protruding portion of each of said contact buttons is physically connected to said carrier.

6. A method of manufacturing a contact assembly comprising the steps of:
   a. depositing a layer of copper on at least a portion of a surface of a brass contact carrier to form a contact support;
   b. placing a silver-cadmium oxide contact in engagement with a first electrical resistance welding electrode;
   c. positioning said support onto said contact;
   d. placing a second electrical resistance welding electrode in engagement with said copper layer and in axial alignment with said contact and said first welding electrode; and
   e. simultaneously applying welding pressure to and current through said electrodes, said contact, said carrier and said copper layer to weld said contact directly to said support.

7. A method according to claim 6 wherein said copper layer is electroplated onto substantially the total surface area of said brass carrier.

8. A method according to claim 7 further comprising the step of welding a plurality of silver-cadmium oxide contacts to said support.

9. A method of manufacturing a contact assembly comprising the steps of:
   a. depositing a copper layer onto substantially the total surface area of a brass contact carrier to form a support;
   b. positioning a silver-cadmium oxide contact member to engage said support and to be in axial alignment with said copper layer; and
   c. electrical resistance welding said member directly to said support.

* * * * *

PO-1050
(5/69)

UNITED STATES PATENT OFFICE
CERTIFICATE OF CORRECTION

Patent No. 3,859,491            Dated January 7, 1975

Inventor(s) Laurence E. Larson

It is certified that error appears in the above-identified patent and that said Letters Patent are hereby corrected as shown below:

Claim 3, line 1,      delete "assesmbly" and insert - assembly -

Claim 5, line 3,      after "said" insert - contact -

IN THE SPECIFICATION

Column 1, line 24,      delete "tobo" and insert - to -

Signed and sealed this 15th day of April 1975.

(SEAL)
Attest:

RUTH C. MASON
Attesting Officer

C. MARSHALL DANN
Commissioner of Patents
and Trademarks